(12) United States Patent
Ishizuka

(10) Patent No.: US 8,027,102 B2
(45) Date of Patent: Sep. 27, 2011

(54) CAM MECHANISM OF A TELESCOPING LENS BARREL

(75) Inventor: Kazunori Ishizuka, Kanagawa (JP)

(73) Assignee: Hoya Corporation, Tokyo (JP)

( * ) Notice: Subject to any disclaimer, the term of this patent is extended or adjusted under 35 U.S.C. 154(b) by 17 days.

(21) Appl. No.: 12/785,886

(22) Filed: May 24, 2010

(65) Prior Publication Data

US 2010/0232036 A1    Sep. 16, 2010

Related U.S. Application Data

(63) Continuation of application No. 11/558,130, filed on Nov. 9, 2006, now abandoned.

(30) Foreign Application Priority Data

Nov. 16, 2005   (JP) .................................. 2005-331591

(51) Int. Cl.
*G02B 7/02* (2006.01)
*G02B 15/14* (2006.01)

(52) U.S. Cl. ...................................... 359/811; 359/699

(58) Field of Classification Search .......... 359/811–814, 359/694, 699, 702–704, 808, 822–824, 830
See application file for complete search history.

(56) References Cited

U.S. PATENT DOCUMENTS

| | | | |
|---|---|---|---|
| 5,225,938 A | 7/1993 | Nomura | |
| 5,416,549 A * | 5/1995 | Katsuyama et al. | .......... 396/529 |
| 5,793,537 A | 8/1998 | Nomura et al. | |
| 5,818,647 A | 10/1998 | Nishio et al. | |
| 5,991,097 A | 11/1999 | Nomura et al. | |
| 6,035,136 A | 3/2000 | Hayashi et al. | |
| 6,081,391 A | 6/2000 | Nishio et al. | |
| 6,661,970 B2 | 12/2003 | Nomura et al. | |
| 6,717,744 B2 | 4/2004 | Nomura et al. | |
| 6,741,401 B2 | 5/2004 | Nomura et al. | |
| 6,751,032 B2 | 6/2004 | Nomura et al. | |

(Continued)

FOREIGN PATENT DOCUMENTS

JP            7-063970           3/1995

(Continued)

OTHER PUBLICATIONS

Japan Office action, dated Jan. 18, 2011 along with an english translation thereof.

*Primary Examiner* — Ricky Mack
*Assistant Examiner* — Dawayne A Pinkney
(74) *Attorney, Agent, or Firm* — Greenblum & Bernstein, P.L.C.

(57) ABSTRACT

A cam mechanism of a lens barrel includes a cam ring; and a movable frame which moves along an optical axis when the cam ring is rotated, without rotating relative to the cam ring, by engagement of a cam groove provided on the cam ring with a corresponding cam follower provided on the movable frame. The cam groove is formed as a bottomed cam groove including two inclined side surfaces and a bottom surface which connects the two inclined side surfaces. The cam ring includes a single-sided cam section on an end surface of the cam ring, wherein continuity of the reference cam diagram is maintained along the single-sided cam section, and at least a part of one of the two inclined side surfaces which is positioned closer to a nearby end of the cam ring is absent at the single-sided cam section.

14 Claims, 16 Drawing Sheets

U.S. PATENT DOCUMENTS

| | | |
|---|---|---|
| 6,753,911 B1 | 6/2004 | Yamada et al. |
| 6,778,334 B2 | 8/2004 | Nomura et al. |
| 6,954,314 B2 | 10/2005 | Nomura et al. |
| 6,987,929 B2 | 1/2006 | Nomura |
| 7,039,308 B2 | 5/2006 | Nomura |
| 7,062,163 B2 | 6/2006 | Nomura |
| 7,088,916 B2 | 8/2006 | Nomura |
| 2004/0042777 A1 | 3/2004 | Nomura |
| 2006/0056078 A1 | 3/2006 | Nomura et al. |
| 2006/0061877 A1 | 3/2006 | Yasui et al. |
| 2007/0092238 A1 | 4/2007 | Shirakata |

FOREIGN PATENT DOCUMENTS

| | | |
|---|---|---|
| JP | 2004-085932 | 3/2004 |
| JP | 2004-85932 | 3/2004 |
| JP | 2004-361519 | 12/2004 |
| JP | 2007-114530 | 5/2007 |
| JP | 2007-114531 | 5/2007 |

\* cited by examiner

CAM MECHANISM OF A TELESCOPING LENS BARREL

CROSS-REFERENCE TO RELATED APPLICATIONS

This is a continuation application of pending U.S. patent application Ser. No. 11/558,130, filed Nov. 9, 2006, which claims priority to Japanese Application NO. P2005-331591, filed Nov. 16, 2005, the contents of which are expressly incorporated by reference herein in their entireties.

BACKGROUND OF THE INVENTION

1. Field of the Invention

The present invention relates to a cam mechanism, having a cam ring and used in a telescoping lens barrel (e.g., a zoom lens), for advancing and retracting a linearly movable ring by rotation of the cam ring.

2. Description of the Related Art

Miniaturization of lens barrels incorporated in optical devices such as cameras has been in increasing demand. In retractable lens barrels such as zoom lens barrels (zoom lenses) which advance and retract by rotation of a cam ring, it is desirable to reduce the length of the cam ring while securing a sufficient range of movement of each movable lens group in an optical axis direction (for example, refer to Japanese Laid-Open Patent Publication (Kokai) No. 2004-085932).

SUMMARY OF THE INVENTION

The present invention has been devised based on the viewpoint that in a cam ring having at least one bottomed cam groove, the width of which decreases in the depth direction and includes two inclined (beveled) side surfaces and a bottom surface connecting the two inclined side surfaces to each other, a cam follower which is engaged in the bottomed cam groove of the cam ring can be guided adequately along the cam groove thereby even if one of the two inclined side surfaces is absent (missing).

According to an aspect of the present invention, a cam mechanism of a lens barrel, is provided, including a cam ring; and a movable frame which moves along an optical axis of an optical system when the cam ring is rotated by engagement of at least one cam groove provided on the cam ring with corresponding at least one cam follower provided on the movable frame, the movable frame supporting at least one optical element of the optical system. The cam groove is formed as a bottomed cam groove including two inclined side surfaces and a bottom surface which connects the two inclined side surfaces to each other, a width of the cam groove decreasing in a depth direction in a cross section orthogonal to a direction of a reference cam diagram of the cam groove. The cam ring includes at least one single-sided cam section on at least one of opposite end surfaces of the cam ring, wherein continuity of the reference cam diagram is maintained along the single-sided cam section, and at least a part of one of the two inclined side surfaces which is positioned closer to a nearby end of the cam ring in the optical axis direction is absent at the single-sided cam section while the other of the two inclined side surfaces remains.

The one of the two inclined side surfaces which is positioned closer to a nearby end of the cam ring in the optical axis direction can be completely absent at the single-sided cam section.

A part of the bottom surface can be absent while the other of the two inclined side surfaces remains.

It is desirable for the cam mechanism to include a linear guide plate which is supported by the cam ring so as to integrally move with the cam ring in the optical axis direction while being allowed to freely rotate relative to the cam ring. The one of the two inclined side surfaces which is positioned closer to the nearby end of the cam ring in the optical axis direction is completely absent in the single-sided cam section of the cam groove. The linear guide plate includes an inclined retaining surface which complements the absent the one of the two inclined side surfaces.

It is desirable for each of the opposite end surfaces of the cam ring to lie in a plane orthogonal to the optical axis.

It is desirable for the lens barrel to be configured as a zoom lens, and for the single-sided cam section to be included in a zooming section of the cam groove for changing a focal length of the zoom lens.

It is desirable for the cam ring and the movable frame to be biased relative to each other in directions to make the cam follower contact with remaining the other of the two inclined side surfaces.

It is desirable for the cam ring to include at least two of the cam grooves which are located at different positions at least in the optical axis direction and trace substantially a same reference cam diagram. The movable frame includes at least two of the cam followers which are located at different positions at least in the optical axis direction and are respectively engageable in the two cam grooves. When the movable frame moves to at least one of opposite movement limits thereof in the optical axis direction, one of the two cam followers remains engaged in corresponding one of the cam grooves while the other of the two cam followers comes out of an end opening of corresponding another of the cam grooves and is disengaged therefrom.

It is desirable for the bottomed cam groove to have a truncated trapezodial shape in cross section.

It is desirable for the cam ring to be positioned around the movable frame, and for the bottomed cam groove to be formed on an inner peripheral surface of the cam ring. The cam follower projects radially outward from an outer peripheral surface of the movable frame and is engaged in the bottomed cam groove.

It is desirable for the optical element of the optical system to be a lens group.

It is desirable for the at least one cam groove to include a plurality of front cam grooves formed at different circumferential positions, and a plurality of rear cam grooves formed at different circumferential positions behind the plurality of front cam grooves, and for the at least one cam follower to include a plurality of front cam followers and a plurality of rear cam followers which are engaged in the plurality of front cam grooves and the plurality of rear cam grooves, respectively.

It is desirable for the single-sided cam section to be formed as part of each of the plurality of front cam grooves which is open on a rear end surface of the cam ring.

It is desirable for each of the front cam grooves and each of the rear cam grooves to be formed as a continuous groove and a discontinuous cam groove, respectively.

According to the cam mechanism to which the present invention is applied, a reduction in axial length of the cam ring is achieved while a necessary range of movement of a lens group and other linearly movable members is maintained.

The present disclosure relates to subject matter contained in Japanese Patent Application No. 2005-331591 (filed on Nov. 16, 2005), which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

FIGS. 1 through 10 show a first embodiment of a cam mechanism of a zoom lens (zoom lens barrel) according to the present invention. The present invention concerns a rotationally driven cam ring 11 of the zoom lens and a second lens group moving frame (linearly movable ring/movable frame) 12 of the zoom lens which is moved linearly without rotating via rotation of the cam ring 11; the remaining structure of the zoom lens which is not related to the present invention will only be briefly described hereinafter.

Figure 1:
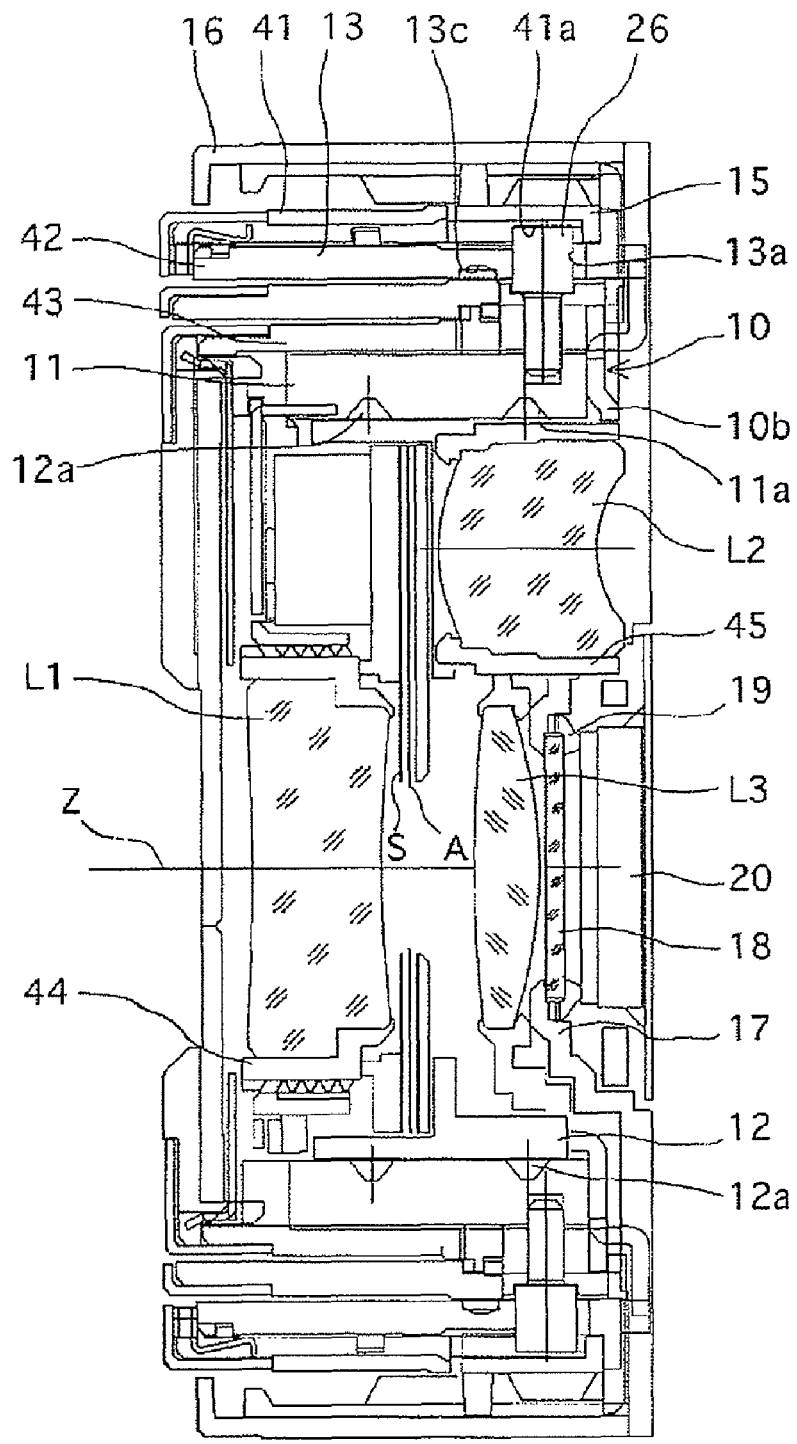
FIG. 1 is a longitudinal sectional view of a first embodiment of a retractable zoom lens according to the present invention, showing the zoom lens in a fully retracted state.
Figure 2:
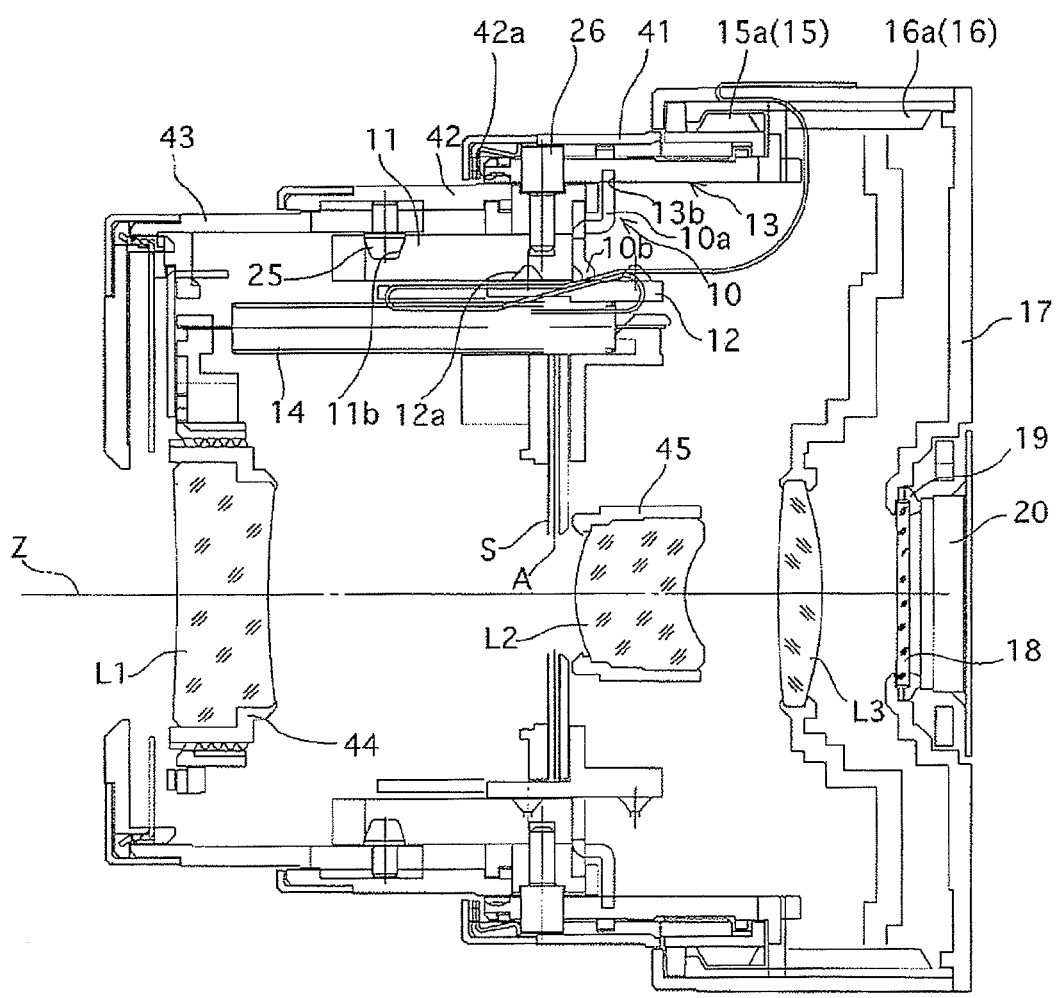
FIG. 2 is a longitudinal sectional view of the zoom lens shown in FIG. 1, showing a ready-to-photograph state of the zoom lens at the wide-angle extremity.
Figure 3:
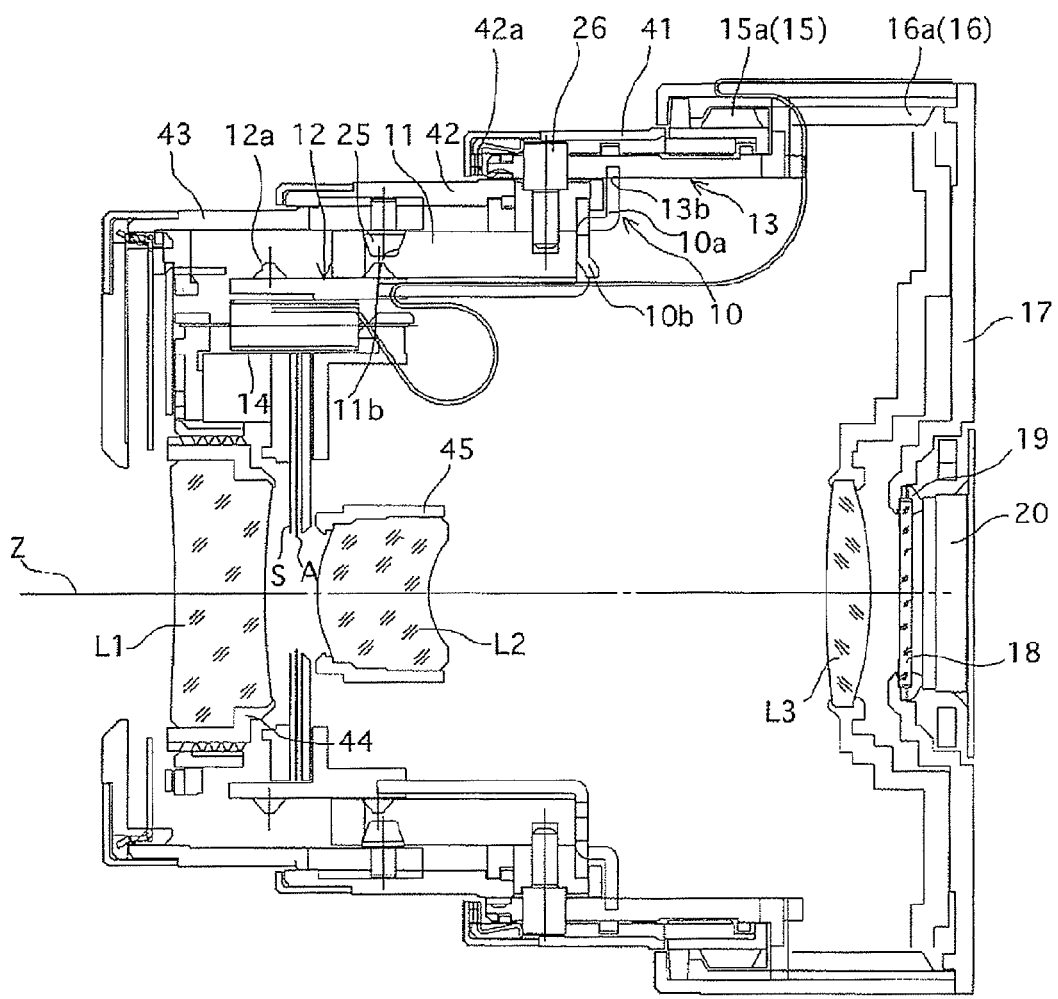
FIG. 3 is a longitudinal sectional view of the zoom lens shown in FIG. 1, showing a ready-to-photograph state of the zoom lens at the telephoto extremity.

The zoom lens 100 is incorporated in a digital camera. FIG. 1 shows a state where the zoom lens 100 is accommodated (fully retracted) in a camera body (not shown). FIG. 2 shows a ready-to-photograph state of the zoom lens at the wide-angle extremity. FIG. 3 shows a ready-to-photograph state of the zoom lens at the telephoto extremity.

The zoom lens 100 is provided with a photographing optical system having a first lens group L1, a shutter S, an adjustable diaphragm A, a second lens group L2, a third lens group L3, a low-pass filter (optical filter) 18 and a CCD image sensor 20. In a ready-to-photograph state of the zoom lens 100, these optical elements are positioned on a photographing optical axis Z. The first lens group L1 and the second lens group L2 are driven along the photographing optical axis Z in a predetermined moving manner to perform a zooming operation, while the third lens group L3 is driven along the photographing optical axis Z to perform a focusing operation.

In the following descriptions, the term "optical axis direction" refers to a direction parallel to the photographing optical axis Z unless there is a different explanatory note on the expression. Additionally, in the following description, the term "forward/rearward direction" refers to a direction along the photographing optical axis Z; the object side (the left side as viewed in FIGS. 1 through 3) and the image side (the right side as viewed in FIGS. 1 through 3) are defined as forward and rearward, respectively.

The zoom lens 100 is provided with a stationary barrel 16 which is positioned in the camera body and fixed thereto. The zoom lens 100 is provided at the rear end of the stationary barrel 16 with a CCD support plate 17. The CCD support plate 17 holds the CCD image sensor 20. The low-pass filter 18 is held by the CCD support plate 17 to be positioned in front of the CCD image sensor 20 via an annular dust-resistant sealing member 19.

The zoom lens 100 is provided immediately above the stationary barrel 16 with a zoom gear (not shown) which is supported by the stationary barrel 16. The stationary barrel 16 is provided on an inner peripheral surface thereof with a female helicoid 16a. Threads of the female helicoid 16a extend in a direction inclined with respect to both the optical axis direction and a circumferential direction of the stationary barrel 16.

The zoom lens 100 is provided inside the stationary barrel 16 with a helicoid ring 15. The helicoid ring 15 is provided on an outer peripheral surface thereof with a male helicoid 16a which is engaged with the female helicoid 16a of the stationary barrel 16. Therefore, when a rotation is transferred from the aforementioned zoom gear to the helicoid ring 15, the helicoid ring 15 moves forward or rearward in the optical axis direction while rotating. Upon moving beyond a predetermined point with respect to the stationary barrel 16, the helicoid ring 15 rotates without moving in the optical axis direction relative to the stationary barrel 16. As will be appreciated from FIGS. 1 through 3, the zoom lens 100 is a telescoping type having three external telescoping barrels: a first external barrel 41, a second external barrel 42 and a third external barrel 43 which are concentrically arranged. The first external barrel 41 is positioned in front of the helicoid ring 15 and rotates with the helicoid ring 15 as one body.

The first external barrel 41 is provided on an inner peripheral surface thereof with three rotation transfer grooves 41a (see FIG. 1) which are parallel to the photographing optical axis Z. The zoom lens 100 is provided, inside the first external barrel 41 and the helicoid ring 15 that rotates as one body, with a linear guide ring 13. The linear guide ring 13 is guided linearly in the optical axis direction without rotating relative to the stationary barrel 16. The first external barrel 41 and the helicoid ring 15 are coupled to the linear guide ring 13 to be allowed to rotate relative to the linear guide ring 13.

The linear guide ring 13 is provided with three roller guide through-slots 13a which radially extend the linear guide ring 13 therethrough between the inner and outer peripheral surfaces thereof. Each roller guide through-slot 13a is provided, at front and rear ends thereof in the optical axis direction, with a front circumferential slot portion and a rear circumferential slot portion, respectively, and is further provided with an inclined lead slot portion which connects the front circumferential slot portion with the rear circumferential slot portion. The front circumferential slot portion and the rear circumferential slot portion of each roller guide through-slot 13a extend parallel to each other in a circumferential direction of the linear guide ring 13.

The zoom lens 100 is provided inside the linear guide ring 13 with a cam ring 11. Front and rear end surfaces of the cam ring 11 are orthogonal to the photographing optical axis Z. Three roller followers 26 fixed to an outer peripheral surface of the cam ring 11 are engaged in the three through-slots 13a, respectively. The three roller followers 26 are further engaged at the radially outer ends thereof in the three rotation transfer grooves 41a of the first external barrel 41 through the three roller guide through-slots 13a, respectively.

Operations of the cam ring 11, the linear guide ring 13, the first external barrel 41 and the helicoid ring 15 relative to the stationary barrel 16 are understood from the above described structure of the zoom lens 100. Namely, rotating the aforementioned zoom gear in a lens barrel advancing direction thereof in the refracted state of the zoom lens 100 shown in FIG. 1 causes the helicoid ring 15 to move forward while rotating due to engagement of the female helicoid 16a with the male helicoid 15a. This rotation of the helicoid ring 15 causes the first external barrel 41 to move forward together with the helicoid ring 15 while rotating together with the helicoid ring 15, and further causes the linear guide ring 13 to move forward together with the helicoid ring 15 and the first external barrel 41.

Rotation of the first external barrel 41 is transferred to the cam ring 11 via the three rotation transfer grooves 41a and the three roller followers 26. Since the three roller followers 26 are also engaged in the three roller guide through-slots 13a, respectively, the cam ring 11 moves forward while rotating relative to the linear guide ring 13 in accordance with contours of the aforementioned inclined lead slot portions of the three roller guide through-slots 13a. Since the linear guide ring 13 itself also moves forward together with the first external barrel 41 and the helicoid ring 15 as described above, the cam ring 11 moves forward in the optical axis direction by an amount of movement corresponding to the sum of the amount of the forward movement of the cam ring 11 relative to linear guide ring 13 due to engagement of the three roller followers 26 with the inclined lead slot portions of the three through-slots 13a, respectively, and the amount of the forward movement of the linear guide ring 13 relative to the stationary barrel 16.

Rotating the aforementioned zoom gear in a lens barrel retracting direction thereof causes the cam ring 11, the linear guide ring 13, the first external barrel 41 and the helicoid ring 15 to operate in the reverse manner to the above described advancing operations. In this reverse operation, the cam ring 11, the linear guide ring 13, the first external barrel 41 and the helicoid ring 15 retract to their respective retracted positions shown in FIG. 1 by rotation of the helicoid ring 15 until the three roller followers 26 enter the aforementioned rear circumferential slot portions of the three roller guide through-slots 13a, respectively.

The structures of elements of the zoom lens 100 which are driven via the cam ring 11 will be discussed hereinafter.

The linear guide ring 13 is provided on an inner peripheral surface thereof with first linear guide grooves 13b (see FIG. 2) and second linear guide grooves 13c (see FIG. 1) which are formed at different circumferential positions and extend parallel to the photographing optical axis Z. The zoom lens 100 is provided inside the linear guide ring 13 with a second lens group linear guide plate (linear guide plate) 10. The second lens group linear guide plate 10 is provided on an outer edge thereof with linear guide projections 10a which project radially outwards to be slidably engaged in the first linear guide grooves 13b of the linear guide ring 13, respectively (see FIG. 2). The second external barrel 42 that is positioned inside of the linear guide ring 13 is provided, on an outer peripheral surface of the second external barrel 42 at the rear end thereof, with linear guide projections 42a which project radially outwards to be slidably engaged in the second linear guide grooves 13c of the linear guide ring 13, respectively. Therefore, both of the second external barrel 42 and the second lens group linear guide plate 10 is guided linearly in the optical axis direction without rotating via the linear guide ring 13.

The second lens group linear guide plate 10 is coupled to the cam ring 11 to be capable of rotating relative to the cam ring 11 and to be movable with the cam ring 11 in the optical axis direction, and guides the second lens group moving frame (linearly movable frame) 12 linearly in the optical axis direction without rotating. The second lens group moving frame 12 is provided on an outer peripheral surface thereof with a plurality of cam followers 12a which are engaged in a corresponding plurality of inner cam grooves 11a which are formed on an inner peripheral surface of the cam ring 11 for moving the second lens group L2, respectively. Since the second lens group moving frame 12 is guided linearly in the optical axis direction without rotating via the second lens group linear guide plate 10, the second lens group moving frame 12 moves in the optical axis direction in a predetermined moving manner in accordance with contours of the inner cam grooves 11a of the cam ring 11.

The zoom lens 100 is provided inside the second lens group moving frame 12 with a second lens frame (radially-retractable lens frame) 45 which supports and holds the second lens group L2. The second lens frame 45 is pivoted to the second lens group moving frame 12 to be swingable between a photographing position (FIGS. 2 and 3) where the optical axis of the second lens group L2 coincides with the photographing optical axis Z and a radially retracted position (retracted away from the optical axis) shown in FIG. 1 where the optical axis of the second lens group L2 is positioned above the photographing optical axis Z. The second lens frame 45 integrally moves with the second lens group moving frame 12 in the optical axis direction.

The third external barrel 43 is positioned between the second external barrel 42 and the cam ring 11. The third external barrel 43 is moved forward and rearward in the optical axis direction in a predetermined moving manner in accordance with rotation of the cam ring 11. The zoom lens 100 is provided inside the third external barrel 43 with a first lens frame 44 which is supported by the third external barrel 43. The first lens group L1 is supported by the third lens frame 44.

Operations of the zoom lens 100 having the above described structure will be discussed hereinafter.

In the retracted state of the zoom lens 100 (shown in FIG. 1), the zoom lens 100 is fully accommodated in the camera body. Upon the main switch of the digital camera in which the zoom lens 100 is incorporated being turned ON, the zoom gear is driven in the lens barrel advancing direction by a driving device such as a zoom motor (not shown). This rotation of the zoom gear causes a combination of the helicoid ring 15 and the first external barrel 41 to move forward while rotating due to engagement of the female helicoid 16a with the male helicoid 15a, and further causes the linear guide ring 13 to move forward linearly without rotating together with the helicoid ring 15 and the first external barrel 41. At this time, the cam ring 11 which rotates by rotation of the first external barrel 41 moves forward in the optical axis direction.

A rotation of the cam ring 11 causes the second lens group moving frame 12, which is positioned inside the cam ring 11, to move in the optical axis direction with respect to the cam ring 11 in a predetermined moving manner due to the engagement of a set of three front cam followers 12a1 with a set of three front inner cam grooves 11a1 and the engagement of a set of three rear cam followers 12a2 with a set of three rear inner cam grooves 11a2, respectively. At this time, the second lens frame 45, which is positioned inside the second lens group moving frame 12, rotates to an inserted position (photographing position) where the optical axis of the second lens group L2 coincides with the photographing optical axis Z. Thereafter, the second lens frame 45 remains held in the inserted position until the zoom lens 100 is retracted into the camera body again (see FIGS. 2 and 3). In addition, a rotation of the cam ring 11 causes the third external barrel 43, which is positioned around the cam ring 11 and guided linearly in the optical axis direction without rotating, to move in the optical axis direction relative to the cam ring 11 in a predetermined moving manner due to engagement of a set of three outer cam grooves 11b (which are formed on an outer peripheral surface of the cam ring 11) with a plurality of cam followers 25 (which project radially inwards from the third external barrel 43), respectively.

Upon the main switch of the digital camera being turned OFF, the zoom gear is driven in a lens barrel retracting direction by the driving device. This rotation of the zoom gear causes the zoom lens 100 to operate in the reverse manner to the above described advancing operation to fully retract the zoom lens 100 into the camera body as shown in FIG. 1.

Figure 5:
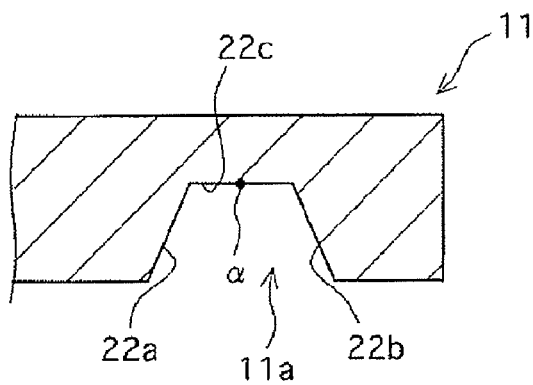
FIG. 5 is a cross sectional view taken along the V-V line shown in FIG. 4.
Figure 6:
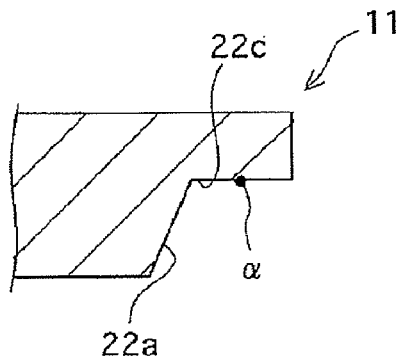
FIG. 6 is a cross sectional view taken along the VI-VI line shown in FIG. 4.

Aspects of the zoom lens 100 characteristic of the present invention will be discussed hereinafter. The inner cam grooves 11a of the cam ring 11 are bottomed cam grooves which have a truncated trapezodial shape, the width of which decreases in the depth direction, in a cross section orthogonal to the direction of elongation of the cam groove. Namely, each inner cam groove 11a includes two inclined side surfaces 22a and 22b and a bottom surface 22c which connects the two inclined side surfaces 22a and 22b to each other as shown in FIG. 5.

The inner cam grooves 11a are formed based on reference cam diagrams "α" having the same shape and size (see FIG. 4) for imparting a required movement to the second lens group moving frame 12. The plurality of inner cam grooves 11a are composed of two sets of inner cam grooves: a set of three front inner cam grooves 11a1 formed at different circumferential positions, and a set of three rear inner cam grooves 11a2 formed at different circumferential positions behind the set of three front inner cam grooves 11a1 in the optical axis direction. Each rear inner cam groove 11a2 is formed on the cam ring 11 as a discontinuous cam groove (see FIG. 4). Each reference cam diagram α represents the shape (cam diagram) of each cam groove of the set of three front inner cam grooves 11a1 and the set of three rear inner cam grooves 11a2, and includes a zooming section and a lens-barrel assembling/disassembling section. Each reference cam diagram α is a curved line which traces widthwise centers of the bottom surface of each cam groove 11a (11a1 and 11a2). The zooming section serves as a lens-barrel operating section (photographable section) for changing focal length of the zoom lens 100.

The set of three front inner cam grooves 11a1 and the set of three rear inner cam grooves 11a2 are for driving one of the lens groups (the second lens group L2 in the illustrated embodiment) which integrally move during a zooming operation of the zoom lens 100. Each of the set of three front inner cam grooves 11a1 is a cam groove formed by tracing the same reference diagrams α having the same shape and size, and each of the set of three rear inner cam grooves 11a2 is a cam groove formed by tracing the same reference diagrams α having the same shape and size. Each reference cam diagram α can be roughly divided into four sections: first through fourth sections α1 through α4. The first section α1 extends in the optical axis direction and is positioned at the front end of the reference cam diagram α in the optical axis direction. The second section α2 extends from a first inflection point αh positioned at the rear end of the first section α1 to a second inflection point αm positioned behind the first inflection point αh in the optical axis direction. The third section α3 extends from the second inflection point αm to a third inflection point αn positioned in front of the second inflection point αm in the optical axis direction. The fourth section α4 extends from the third inflection point αn.

Each front inner cam groove 11a1 does not cover the entire range of the associated reference cam diagram α, and each rear inner cam groove 11a2 does not cover the entire range of the associated reference cam diagram α. A range of each front inner cam groove 11a1 which is included in the associated reference cam diagram α is different from a range of each rear inner cam groove 11a2 which is included in the associated reference cam diagram α.

Figure 4:
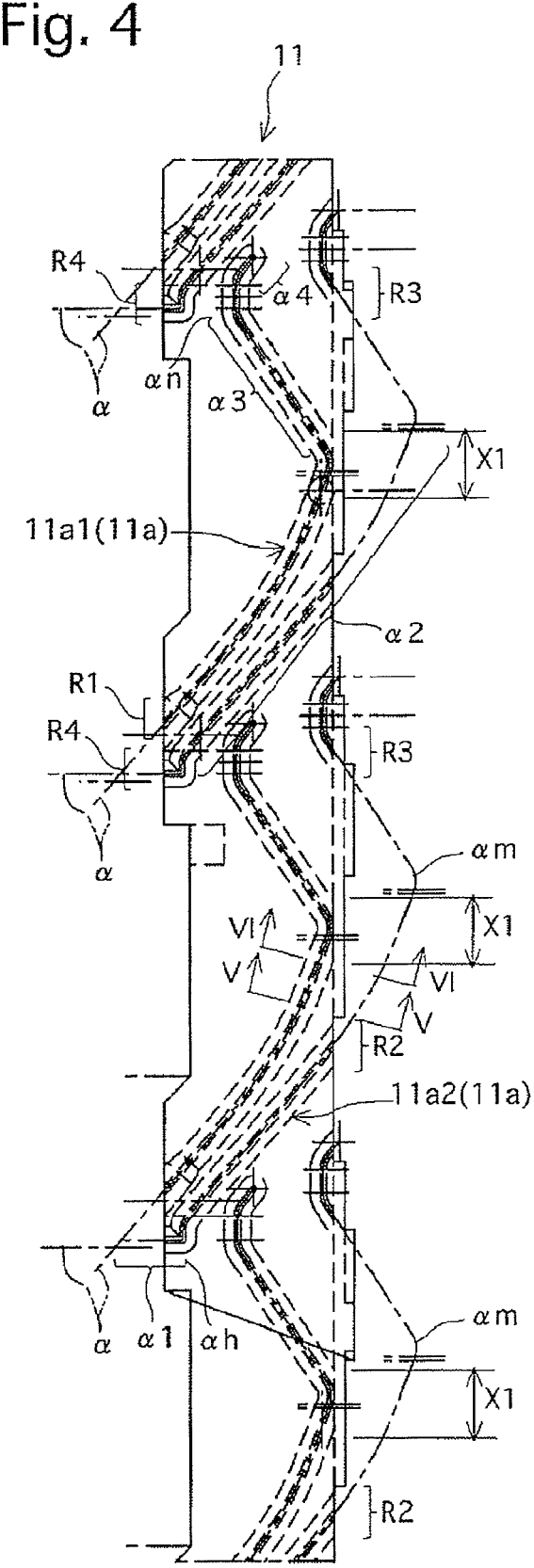
FIG. 4 is a developed view of a cam ring shown in FIGS. 1 through 3, showing inner cam grooves (for moving the second lens group of the zoom lens) of the cam ring by broken lines.

Namely, as shown in FIG. 4, each front inner cam groove 11a1 is formed in the vicinity of the front end of the cam ring 11 without including the entire part of the first section α1 and a part of the second section α2, and is formed so as to include a front end opening R1 at an intermediate point of the second section α2 so that the front end opening R1 opens on a front end surface of the cam ring 11. On the other hand, each rear inner cam groove 11a2 is formed in the vicinity of the rear end of the cam ring 11 without including adjoining portions of the second section α2 and the third section α3 on opposite sides of the second inflection point αm. In addition, each rear inner cam groove 11a2 is formed to include a front end opening R4 at the front end of the first section α1 so that the front end opening R4 opens on a front end surface of the cam ring 11.

Figure 7:
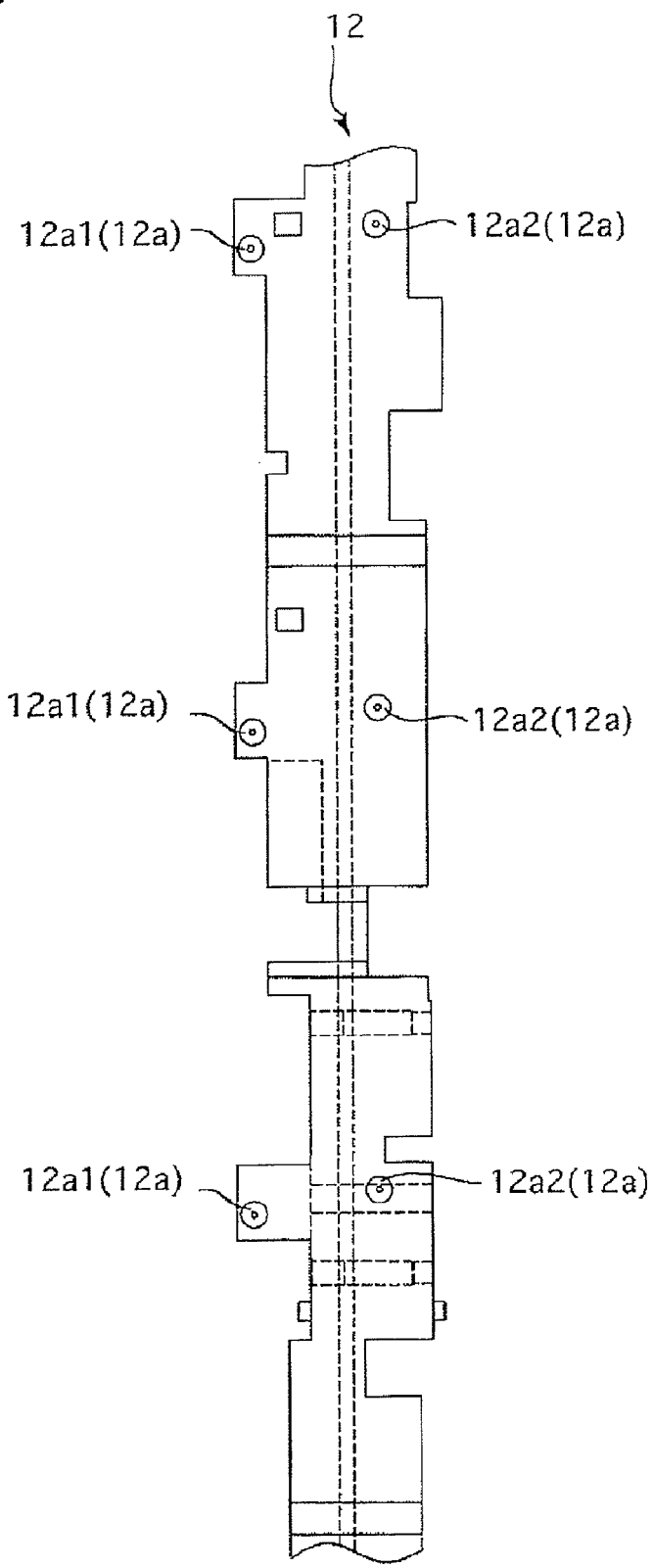
FIG. 7 is a developed view of a second lens group moving frame shown in FIGS. 1 through 3.

As shown in FIG. 7, the plurality of cam followers 12a of the second lens group moving frame 12 consist of a set of three front cam followers 12a1 which are formed at different circumferential positions, and a set of three rear cam followers 12a2 which are formed at different circumferential positions behind the set of three front cam followers 12a1 in the optical axis direction. The set of three front cam followers 12a1 and the set of three rear cam followers 12a2 have cross sectional shapes corresponding to the cross sectional shapes of the set of three front inner cam grooves 11a1 and the set of three rear inner cam grooves 11a2, respectively. The space between the set of three front cam followers 12a1 and the set of three rear cam followers 12a2 in the optical axis direction is determined so that the set of three front cam followers 12a1 are respectively engaged in the set of three front inner cam grooves 11a1 and the set of three rear cam followers 12a2 are respectively engaged in the set of three rear inner cam grooves 11a2.

Each front inner cam groove 11a1 is provided with a single-sided cam section (see FIGS. 4, 8 and 10) X1 as a part of the zooming section (the second section α2 and the third section α3). A rear end portion of the cam ring 11 is absent from the single-sided cam section X1 of each front inner cam groove 11a1 in a manner so that the continuity of the reference cam diagram α is maintained, and so that the inclined side surface 22a and the bottom surface 22c remain in the single-sided cam section X1 (see FIG. 6). In the single-sided cam section X1, the inclined side surface 22b is absent by a greater amount as the reference cam diagram α of each front inner cam groove 11a1 approaches the second inflection point αm, and is completely absent in the vicinity of the second inflection point αm.

The head (radially outer end portion) of each front cam follower 12a1 is supported by the bottom surface 22c of the associated front inner cam groove 11a1 (to be prevented from coming out therefrom in a radial direction) even when positioned in the single-sided cam section X1, and accordingly, the radial position of the second lens group moving frame 12 does not become unstable, so that the reliability of the operation of the second lens group moving frame 12 is not impaired.

The zoom lens 100 is provided between the first lens frame 44 and the second lens group moving frame 12 with an extension spring 14 which is extended so as to be installed therebetween (see FIGS. 2 and 3). Pulling the first lens frame 44 and the second lens group moving frame 12 toward each other by the extension spring 14 causes the cam ring 11 and the second lens group moving frame 12 to move relatively in directions to make each cam follower 12a contact the inclined side surface 22a of the associated inner cam groove 11a. Accordingly, each front cam follower 12a1 can be securely made to remain in contact with the inclined side surface 22a of the associated front inner cam groove 11a1 even when positioned in the single-sided cam section X1.

Figure 22:
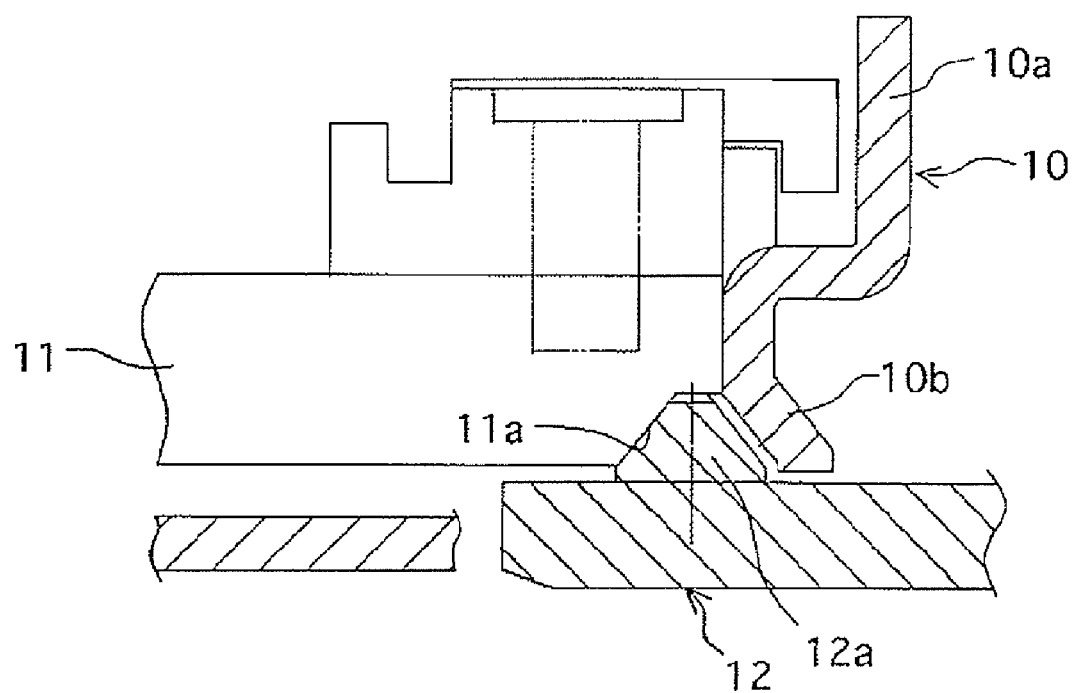
FIG. 22 is a longitudinal sectional view of a portion of the zoom lens shown in FIGS. 1 through 3, showing the positional relationship between a cam follower of the second lens group moving frame for moving the second lens group and a inclined retaining surface formed on a second linear guide ring shown in FIGS. 1 through 3 when the cam follower is in the single-sided cam section of the zooming section of the associated inner cam groove formed on the cam ring.

The second lens group linear guide plate 10 is further provided with three inclined retaining surfaces 10b (see FIGS. 1, 3 and 22). The three inclined retaining surfaces 10b are arranged to correspond to the absent portions of the inclined side surfaces 22b of the three front inner cam grooves 11a1 when the three front cam followers 12a1 pass through the single-sided cam sections X1 of the three front grooves 11a1, respectively. This arrangement of the three inclined retaining surfaces 10b prevents each cam follower 12a from deviating from the associated reference cam diagram α even if a shock or an impact is applied to the zoom lens 100.

Figure 8:
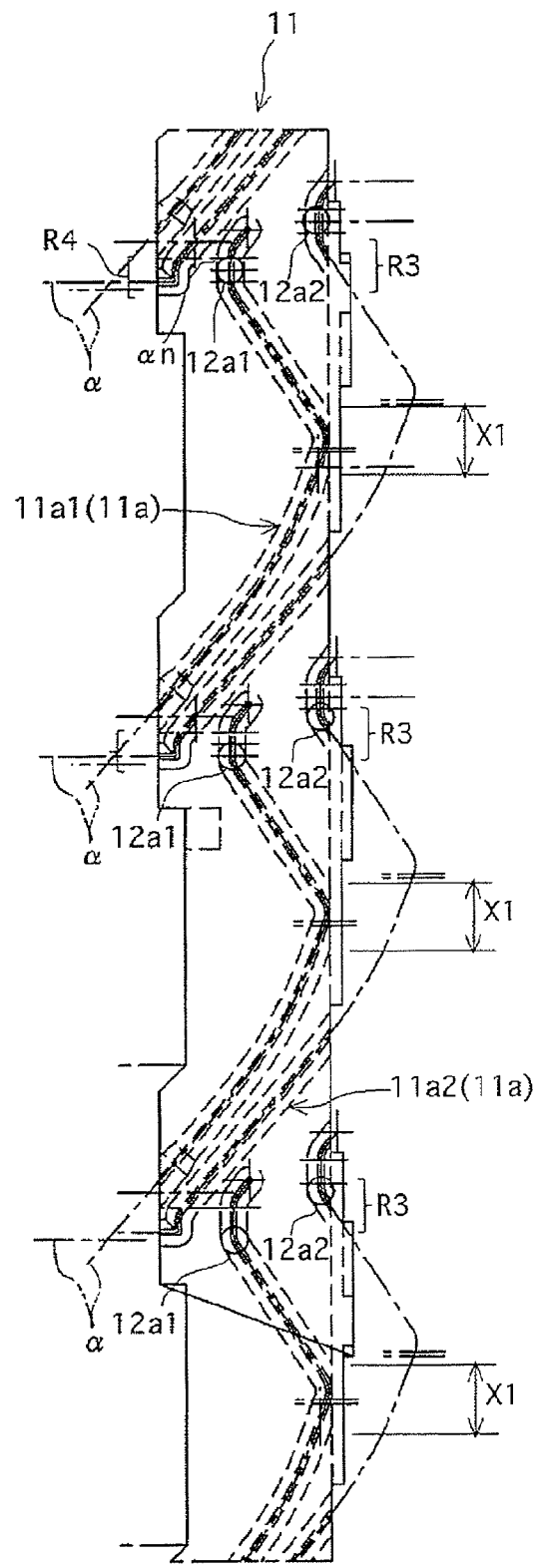
FIG. 8 is a developed view of the cam ring and the second lens group moving frame, showing the positional relationship therebetween in the retracted state of the retractable zoom lens.

FIG. 8 shows the positional relationship between the plurality of inner cam grooves 11a and the plurality of cam followers 12a when the zoom lens 100 is the fully retracted state as shown in FIG. 1. When the zoom lens 100 is the fully retracted state, each front cam follower 12a1 is positioned in the associated front inner cam groove 11a1 in the vicinity of the third inflection point αn thereof while each rear cam follower 12a2 is positioned in the associated rear inner cam groove 11a2 in the vicinity of the third inflection point αn thereof. Each front cam follower 12a1 and each rear cam follower 12a2 are engaged in the associated front inner cam groove 11a1 and the associated rear inner cam groove 11a2, respectively.

Rotating the cam ring 11 in the lens barrel advancing direction (upwards as viewed in FIG. 8), from the fully retracted state of the zoom lens 100 shown in FIG. 1, causes each front cam follower 12a1 and each rear cam follower 12a2 to be guided rearward in the optical axis direction to move on the third section α3 toward the second inflection point αm by the associated front inner cam groove 12a1 and the associated rear inner cam groove 12a2, respectively. In the middle of this movement of each cam follower 12a, each rear cam follower 12a2 is disengaged from the associated rear inner cam groove 11a2 through a first rear end opening R3 thereof at a rear end surface of the cam ring 11 because each rear inner cam groove 11a2 does not include adjoining portions of the second section α2 and the third section α3 on opposite sides of the second inflection point αm. At this time, each front cam follower 12a1 remains engaged in the associated front inner cam groove 11a1 since each front inner cam groove 11a1 includes a rear portion thereof in the optical axis direction which corresponds to the absent rear portion of each rear inner cam groove 11a2 in the optical axis direction, and therefore, each front cam follower 12a1 and each rear cam follower 12a2 move without deviating from the associated reference cam diagrams α.

Further rotating the cam ring 11 in the lens barrel advancing direction causes each front cam follower 12a1 to move to the wide-angle extremity position (the position shown in FIG. 9) while being guided by the single-sided cam section X1 of the associated front inner cam groove 11a1. Although the cam ring 11 and the second lens group moving frame 12 are guided only by engagement of each front cam follower 12a1 with the inclined side surface 22a and the bottom surface 22c of the associated front inner cam groove 11a1 when the set of three front cam followers 12a1 are respectively engaged in the single-sided cam sections X1 of the set of three front cam grooves 11a1, each of the cam ring 11 and the second lens group moving frame 12 is guided without departing from the reference cam diagrams α.

Figure 9:
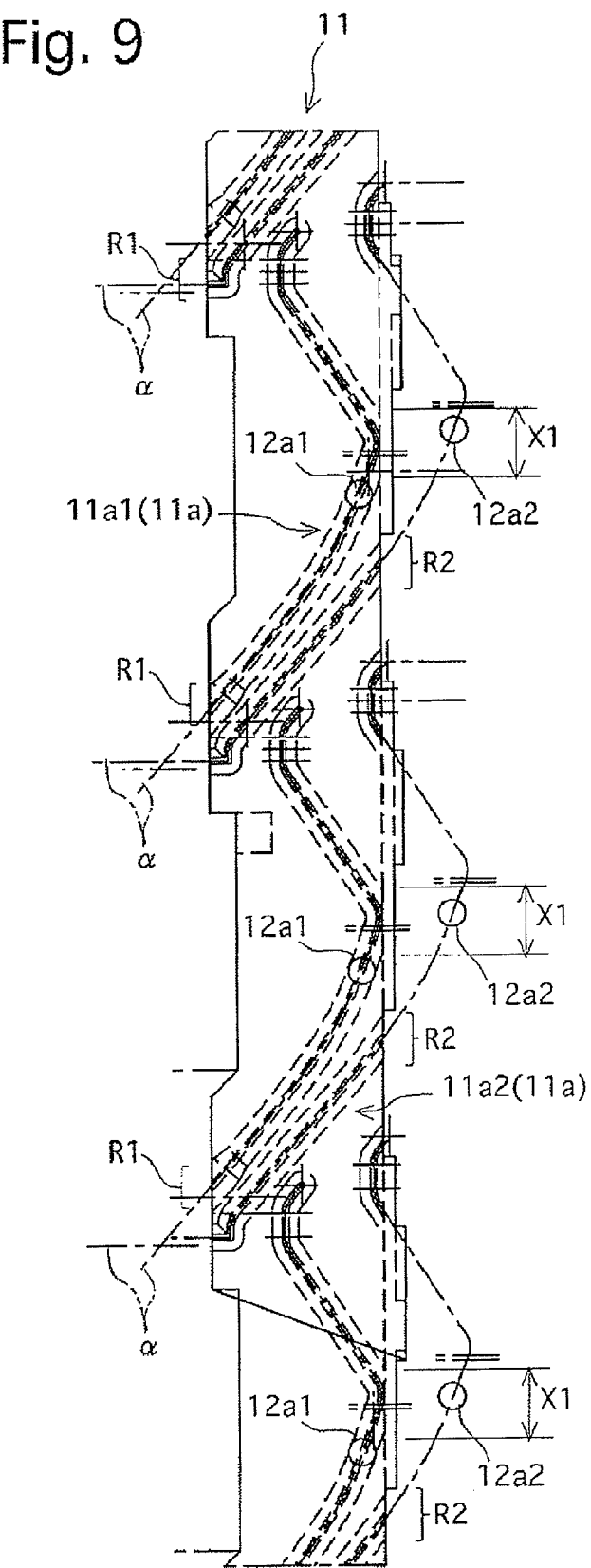
FIG. 9 is a developed view of the cam ring and the second lens group moving frame, showing the positional relationship therebetween in a ready-to-photograph state of the zoom lens at the wide-angle extremity.

FIG. 9 shows the positional relationship between the plurality of inner cam grooves 11a and the plurality of cam followers 12a when the zoom lens 100 is at the wide-angle extremity as shown in FIG. 2. In this state, each rear cam follower 12a2 is disengaged from the associated rear inner cam groove 11a2 while each front cam follower 12a1 remains engaged in the associated front inner cam groove 11a1.

The rotational angle control of the cam ring 11 is generally performed with the zooming section divided into a finite number of steps. In this type of control, it is desirable that each front cam follower 12a1 not stop at any position within the single-sided cam section X1 of the associated front inner cam groove 11a1 to prevent the cam ring 11 from coming off the second lens group moving frame 12. Therefore, it is desirable that a control program prohibiting the cam ring 11 from stopping rotation thereof relative to the second lens group moving frame 12 when each front cam follower 12a1 is positioned within the single-sided cam section X1 of the associated front inner cam groove 11a1 be set in advance.

Rotating the cam ring 11 in the lens barrel advancing direction (upwards as viewed in FIG. 9) in the state where the zoom lens 100 is at the wide-angle extremity causes each front cam follower 12a1 to be guided forward in the optical axis direction to move along the second section α2 toward the first section α1 of the associated front inner cam groove 11a1. Due to this forward movement of each front cam follower 12a1, each rear cam follower 12a2 which is currently disengaged from the associated rear inner cam groove 11a2 moves along the second section α2 toward the first section α1, and enters a second rear end opening R2 formed on a rear end surface of the cam ring 11 to be re-engaged in the associated rear inner cam groove 11a2. Upon this re-engagement of each rear cam follower 12a2 with the associated rear inner cam groove 11a2, each front cam follower 12a1 and each rear cam follower 12a2 are guided by the associated front inner cam groove 11a1 and the associated rear inner cam groove 11a2, respectively. Further rotating the cam ring 11 in the lens barrel advancing direction causes each front cam follower 12a1 to be disengaged from the associated front inner cam groove 11a1 through the front end opening R1. At this time, each rear cam follower 12a2 remains engaged in the associated rear inner cam groove 11a2. Due to this engagement of each cam follower 12a with the associated inner cam groove 11a, the second lens group moving frame 12 moves in the optical axis direction by rotation of the cam ring 11.

Figure 10:
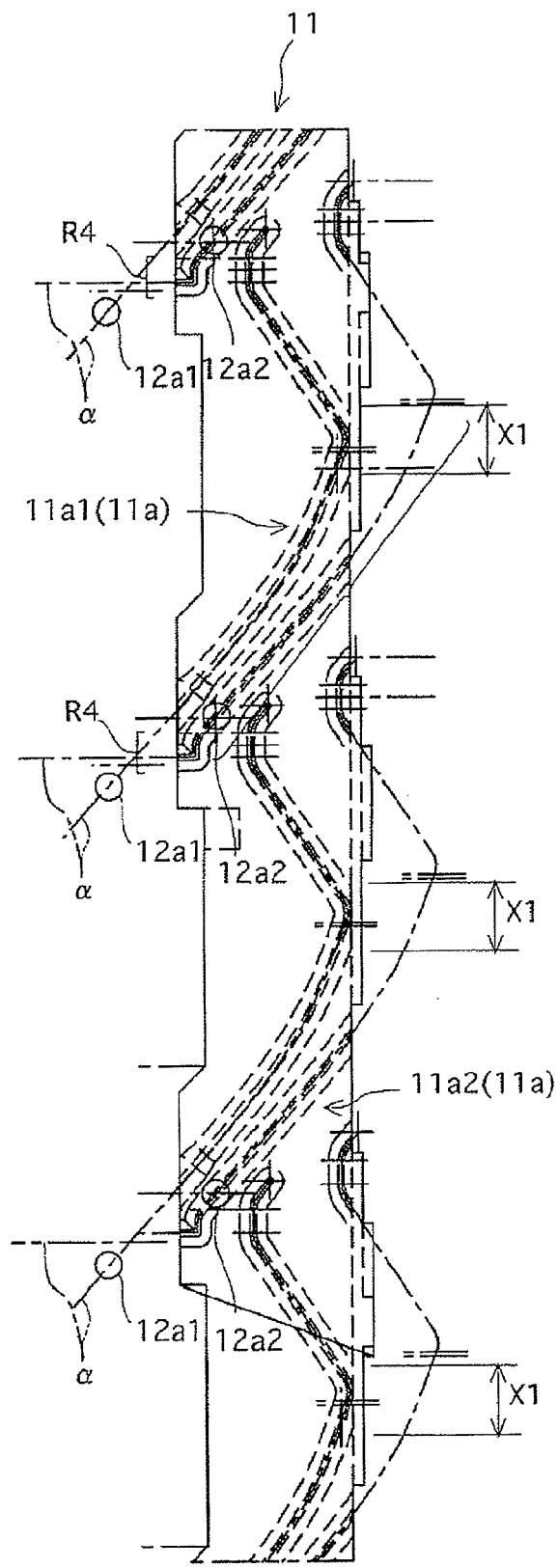
FIG. 10 is a developed view of the cam ring and the second lens group moving frame, showing the positional relationship therebetween in a ready-to-photograph state of the zoom lens at the telephoto extremity.
Figure 11:
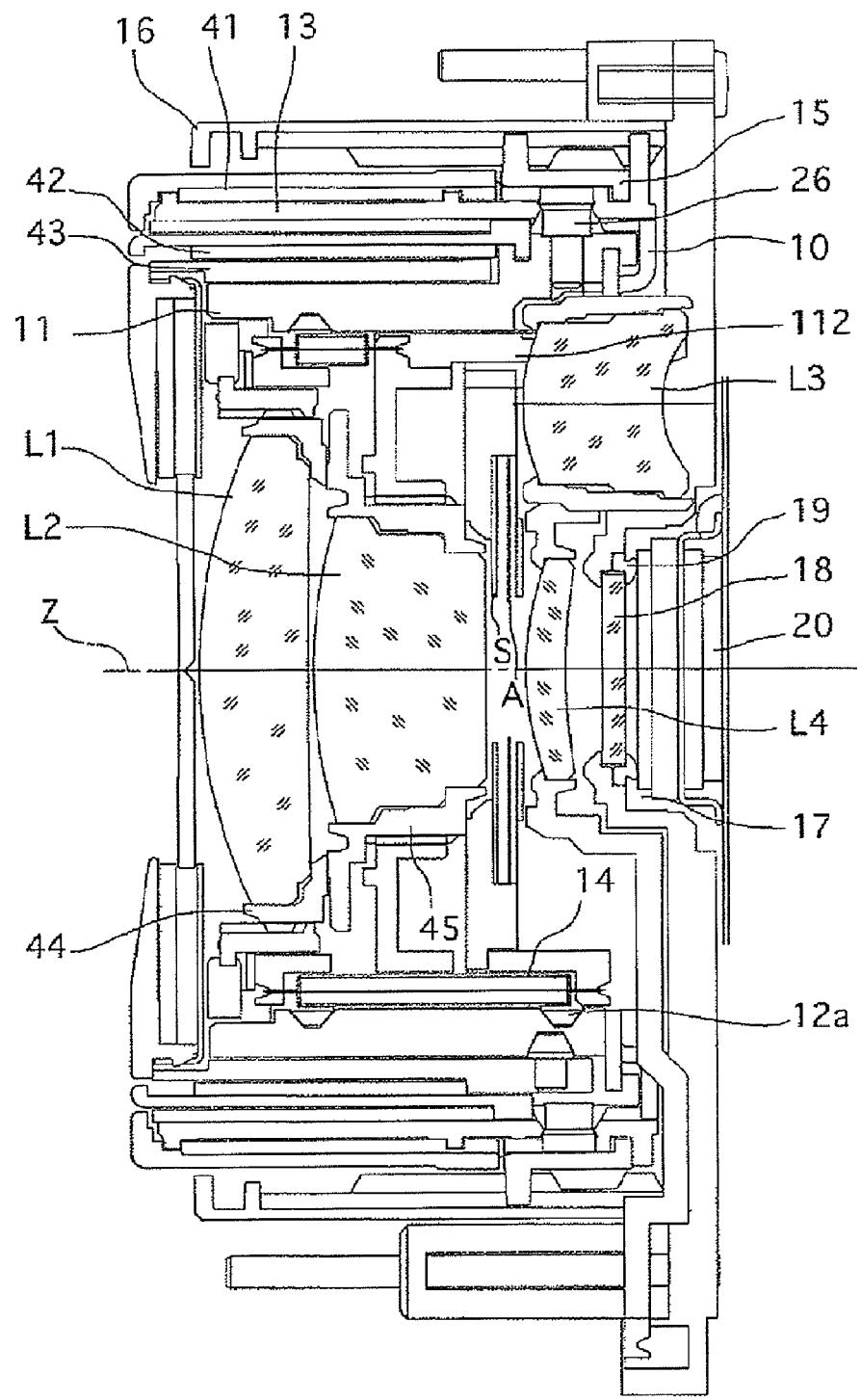
FIG. 11 is a longitudinal sectional view of a second embodiment of the retractable zoom lens according to the present invention, showing the zoom lens in the retracted state.
Figure 12:
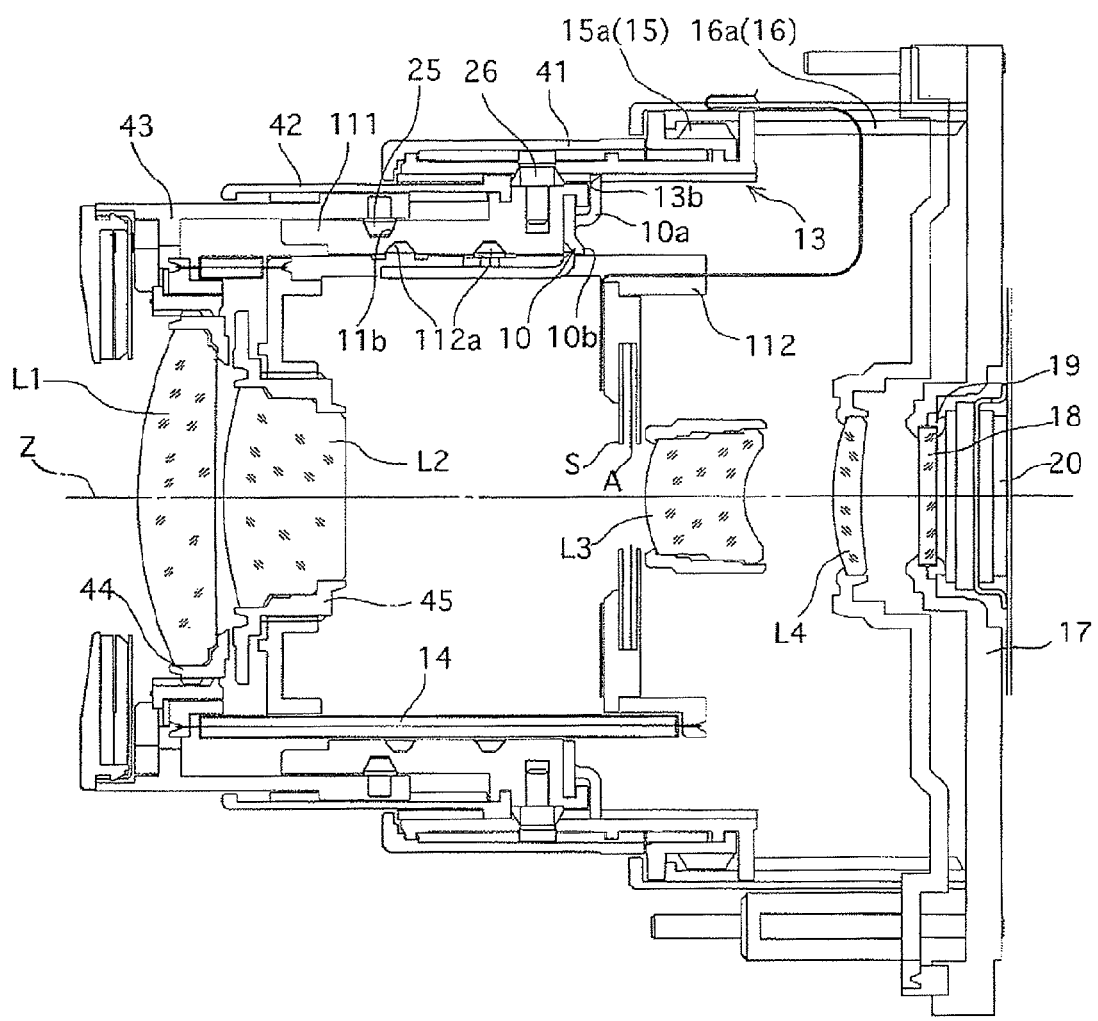
FIG. 12 is a longitudinal sectional view of the zoom lens shown in FIG. 11, showing a ready-to-photograph state of the zoom lens at the wide-angle extremity.
Figure 13:
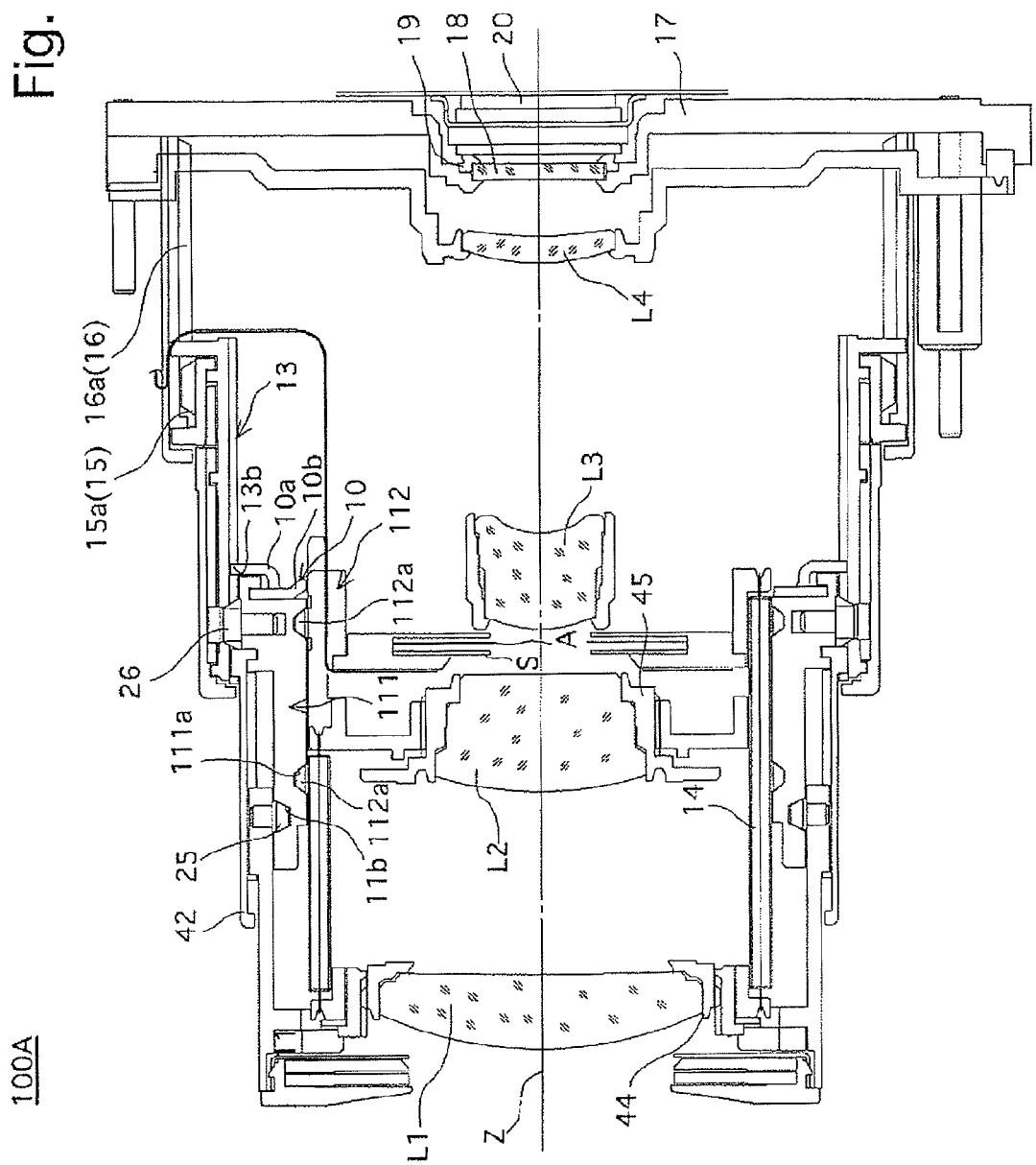
FIG. 13 is a longitudinal sectional view of the zoom lens shown in FIG. 11, showing a ready-to-photograph state of the zoom lens at the telephoto extremity.

FIG. 10 shows the positional relationship between the plurality of inner cam grooves 11a and the plurality of cam followers 12a when the zoom lens 100 is at the telephoto extremity as shown in FIG. 3. In this state, although each front cam follower 12a1 is disengaged from the associated front inner cam groove 11a1 through the front end opening R1 thereof, each front cam follower 12a1 does not deviate from the associated reference cam diagram α, because each rear cam follower 12a2 remains engaged in the associated rear inner cam groove 11a2.

Further rotating the cam ring 11 in the lens barrel advancing direction (upwards as viewed in FIG. 10) in the state where the zoom lens 100 is set at the telephoto extremity causes each rear cam follower 12a2 to enter the first section α1 via the first inflection point αh. At this time, each front cam follower 12a1 has been disengaged from the associated front inner cam groove 11a1, and only each rear cam follower 12a2 is engaged in a front end portion (the first section α1) of the associated rear inner cam groove 11a2 which extends in the optical axis direction, so that the second lens group moving frame 12 can be removed from the cam ring 11 from the front thereof in the optical axis direction by pulling the second lens group moving frame 12 out of the cam ring 11 forward in the optical axis direction.

As described above, the three front inner cam grooves 11a1 include the three single-sided cam sections X1, respectively. Although the inclined side surface 22b of the front inner cam groove 11a in the direction of elongation thereof is completely absent from the bottom end to the radially upper end in the single-sided cam section X1 of each front inner cam groove 11a, each front cam follower 12a1 that is engaged in the associated front inner cam groove 11a1 moves on the associated reference cam diagram α while sliding along the inclined side surface 22a and the bottom surface 22c of the associated front inner cam groove 11a1, and each rear cam follower 12a2 that is engaged in the associated rear inner cam groove 11a2 moves on the associated reference cam diagram α while sliding along the inclined side surface 22a and the bottom surface 22c of the associated rear inner cam groove 11a2. This structure makes it possible for the second lens group moving frame 12 to move in the optical axis direction by a predetermined amount of movement. Therefore, a reduction in length of the cam ring 11 in the optical axis direction is achieved without sacrificing the amount of movement of the second lens group moving frame 12 (the second lens group L2) in the optical axis direction.

FIGS. 11 through 16 show a second embodiment of the cam mechanism of the zoom lens according to the present invention. The zoom lens 100A is provided with a photographing optical system including four lens groups having a first lens group L1, a second lens group L2, a shutter S, an adjustable diaphragm A, a third lens group L3, a fourth lens group L4, a low-pass filter (optical filter) 18 and a CCD image sensor 20. The basic structure of the mechanism for advancing and retracting the zoom lens 100A is the same as that of the first embodiment of the zoom lens 100.

Figure 15:
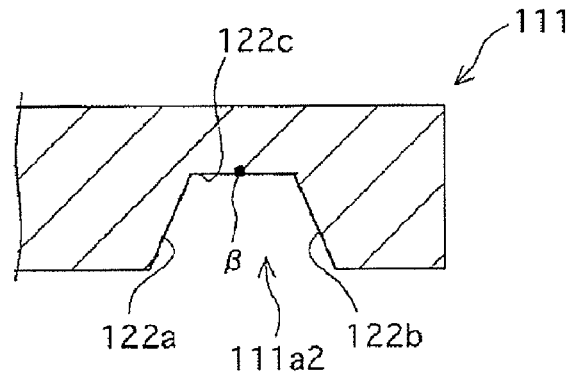
FIG. 15 is a cross sectional view taken along XV-XV line shown in FIG. 14.
Figure 16:
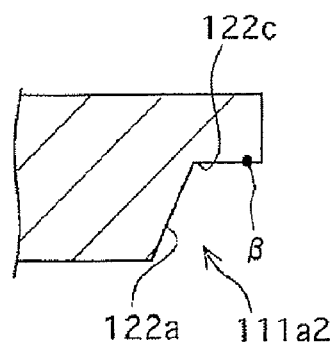
FIG. 16 is a cross sectional view taken along XVI-XVI line shown in FIG. 14.
Figure 14:
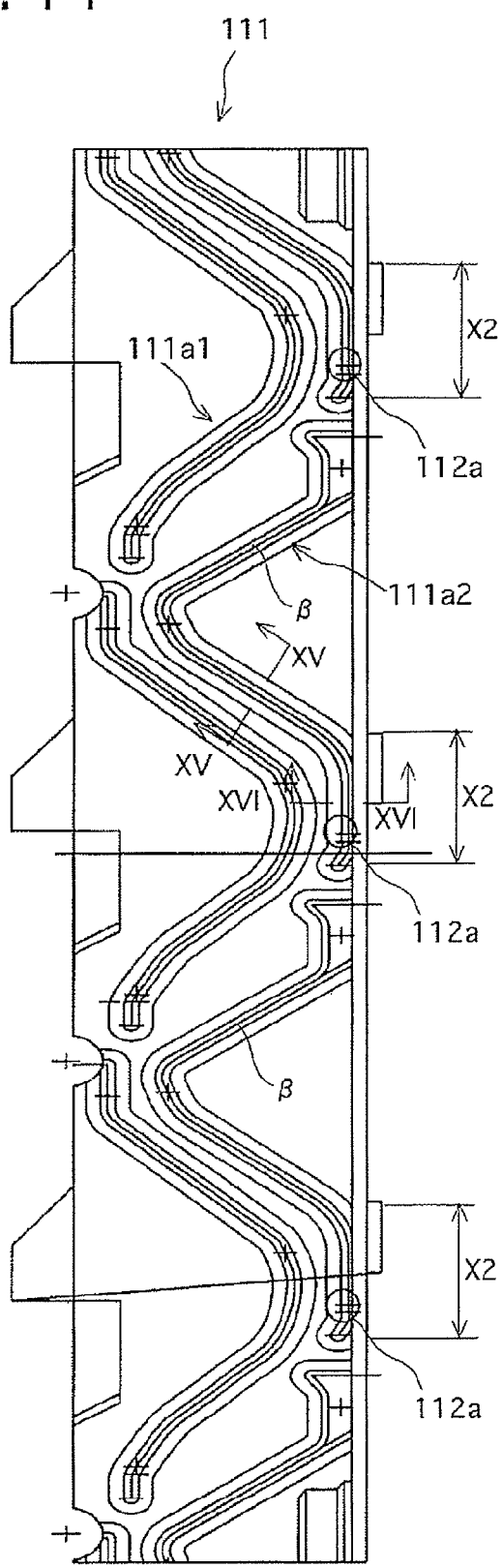
FIG. 14 is a developed view of a cam ring shown in FIGS. 11 through 13, showing inner cam grooves (for moving the second lens group and the third lens group of the zoom lens) of the cam ring and cam followers (for moving a third lens group moving frame shown in FIGS. 11 through 13) by broken lines.

As shown in FIG. 14, the cam ring 111 of the zoom lens 100A is provided with a set of three front inner cam grooves 111a1, formed at different circumferential positions, for moving the second lens group L2 in the optical axis direction, and a set of three rear inner cam grooves 111a2, formed at different circumferential positions behind the set of three front inner cam grooves 111a1 in the optical axis direction, for moving the third lens group L3 in the optical axis direction. The set of three rear inner cam grooves 111a2 are formed based on reference cam diagrams "β". As shown in FIG. 15, each rear inner cam groove 111a2 includes two inclined side surfaces 122a and 122b and a bottom surface 122c which connects the two inclined side surfaces 122a and 122b to each other. A set of three cam followers 112a which project radially outward from an outer peripheral surface of a third lens group moving frame 112 of the zoom lens 100A are engaged in the set of three rear inner cam grooves 111a2, respectively.

Each rear inner cam groove 111a2 is provided with a single-sided cam section X2 as a part of the zooming section. The entire part of the inclined side surface 122b and a part of the bottom surface 122c is absent from the single-sided cam section X2 of each rear inner cam groove 11a2 so that only the inclined side surface 122a in the single-sided cam section X2 remains (see FIG. 16). In the single-sided cam section X2, the inclined side surface 122b is absent by a greater amount as the reference cam diagram β approaches the center of the single-sided cam section X2 from the opposite ends thereof in a circumferential direction of the cam ring 111 (vertical direction as viewed in FIG. 14). Additionally, in the single-sided cam section X2, the bottom surface 122c is gradually reduced with the inclined side surface 122b, and is absent along the reference cam diagram β in the vicinity of the center of the single-sided cam section X2 in a circumferential direction of the cam ring 111.

The head (radially outer end portion) of each cam follower 112a is supported by the bottom surface 122c of the associated rear inner cam groove 111a2 (to be prevented from coming out therefrom in a radial direction) even when positioned in the single-sided cam section X2. Therefore, each cam follower 112a does not deviate from the reference cam diagram β of the associated rear inner cam groove 111a2 even when moving in the single-sided cam section X2.

Moreover, the head of each cam follower 112a is biased against the remaining inclined side surface 122a of the associated rear inner cam groove 111a2 by the extension springs 14 which is extended and installed between the first lens frame 44 and the third lens group moving frame 112, and therefore, each cam follower 112a can securely move on the reference cam diagram β of the associated rear inner cam groove 111a2. Additionally, the three inclined retaining surfaces 10b of the second lens group linear guide plate 10 are arranged to correspond to the absent portions of the inclined side surfaces 122b of the three rear inner cam grooves 111a2 when the three cam followers 112a pass through the single-sided cam sections X2 of the three rear inner cam grooves 111a2, respectively (see FIGS. 12 and 13). This arrangement of the three inclined retaining surfaces 10b of the second lens group linear guide plate 10 prevents each cam follower 112a from deviating from the associated reference cam diagram β even if a shock or an impact is applied to the zoom lens 100A.

Figure 17:
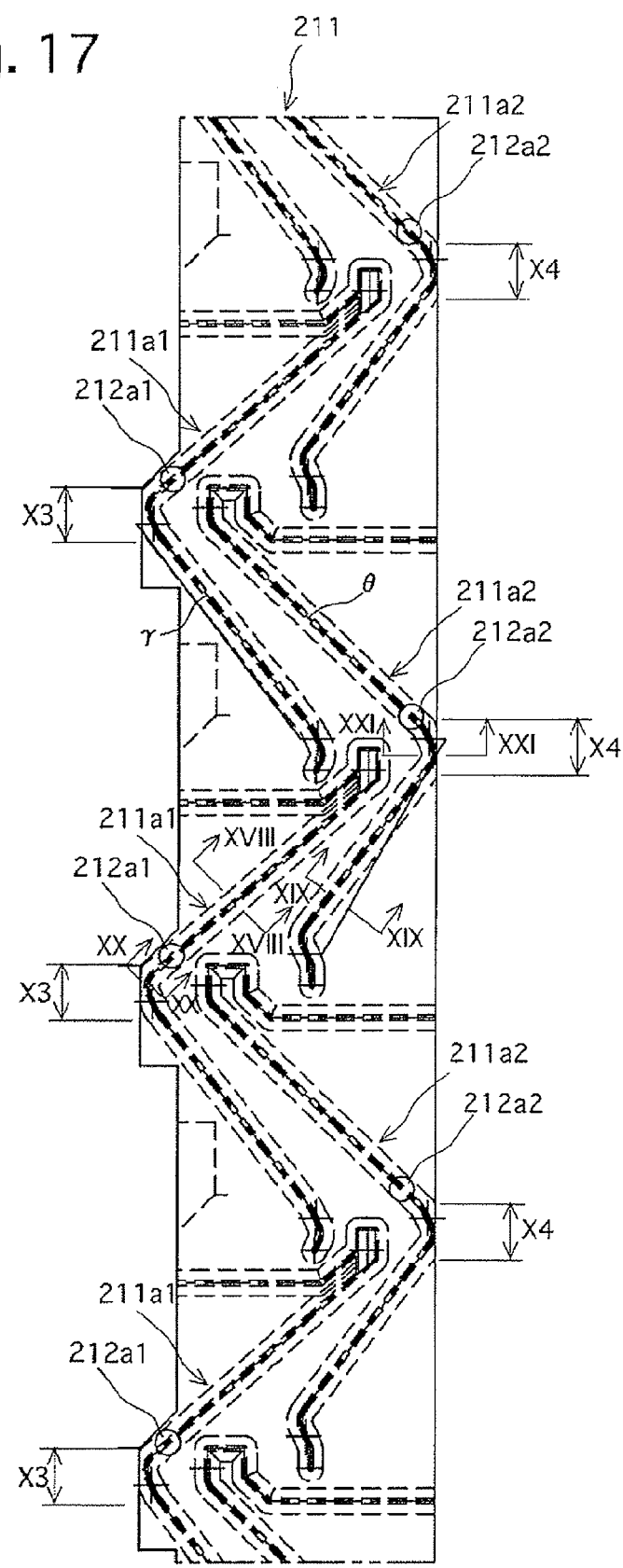
FIG. 17 is a developed view of another embodiment of a cam ring which corresponds to each of the cam rings shown in FIGS. 4 and 14, with both front and rear ends of the cam ring absent.
Figure 18:
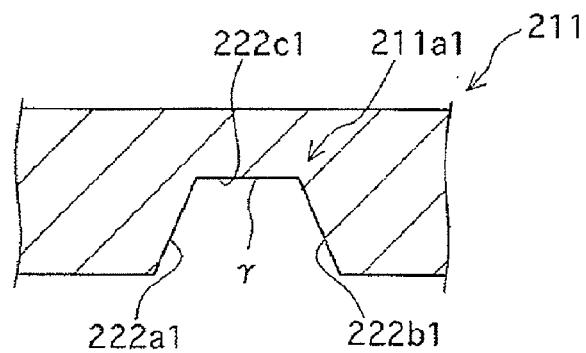
FIG. 18 is a cross sectional view taken along XVIII-XVIII line shown in FIG. 17.
Figure 19:
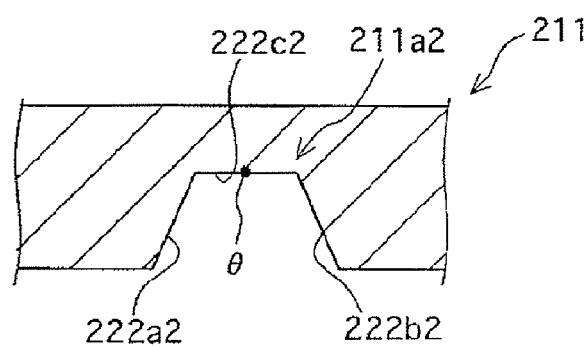
FIG. 19 is a cross sectional view taken along XIX-XIX line shown in FIG. 17.
Figure 20:
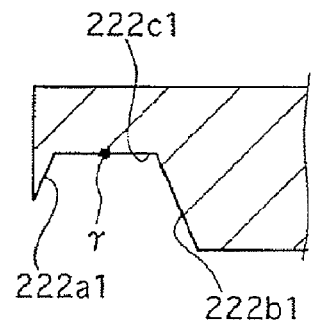
FIG. 20 is a cross sectional view taken along XX-XX line shown in FIG. 17.
Figure 21:
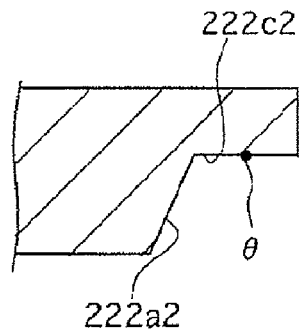
FIG. 21 is a cross sectional view taken along XXI-XXI line shown in FIG. 17.

Although a rear end portion of the cam ring (11 or 111) is absent in each of the above described first and second embodiments, both a front end portion and a rear end portion of the cam ring can be absent. Specifically, as shown in FIG. 17, a set of three front inner cam grooves 211a1 and a set of three rear inner cam grooves 211a2 are formed on an inner peripheral surface of a cam ring 211. Each front inner cam groove 211a1 has the wide-angle extremity position thereof at the front end of the cam ring 211 and each rear inner cam groove 211a2 has the wide-angle extremity position thereof at the rear end of the cam ring 211. Each front inner cam groove 211a1 includes two inclined side surfaces 222a1 and 222b1 and a bottom surface 222c1 which connects the two inclined side surfaces 222a1 and 222b1 to each other as shown in FIG. 18, and each rear inner cam groove 211a2 includes two inclined side surfaces 222a2 and 222b2 and a bottom surface 222c2 which connects the two inclined side surfaces 222a2 and 222b2 to each other as shown in FIG. 19. Each front inner cam groove 211a1 is provided in the vicinity of the wide-angle extremity position thereof with a single-sided cam section X3, and each rear inner cam groove 211a2 is provided in the vicinity of the wide-angle extremity position thereof with a single-sided cam section X4. The inclined side surface 222a1 of the front inner cam groove 211a1 in the direction of elongation thereof is partly absent in the single-sided cam section X3 of each front inner cam groove 211a1 with the two inclined side surfaces 222b1 and 222c1 remaining (see FIG. 20). The inclined side surface 222a2 of the rear inner cam groove 211a2 in the direction of elongation thereof is completely absent from the bottom end to the radially outer end in the single-sided cam section X4 of each rear inner cam groove 211a2, with the two inclined side surfaces 222b2 and 222c2 remaining (see FIG. 21).

A set of three front cam followers 212a1 are engaged in the set of three front inner cam grooves 211a1, respectively. Even when each front cam follower 212a1 passes through the single-sided cam section X3 of the associated front inner cam groove 211a1, each front cam follower 212a1 does not deviate from a reference cam diagram γ of the associated front inner cam groove 211a1 since the head (radially outer end portion) of each front cam follower 212a1 is supported by the bottom surface 222c1 of the associated front inner cam groove 211a1 (to be prevented from coming out therefrom in a radial direction) and since a part of the inclined side surface 222a1 of the front inner cam groove 211a1 remains in the single-sided cam section X3. On the other hand, a set of three rear cam followers 212a2 are engaged in the set of three rear inner cam grooves 211a2, respectively. Even when each rear cam follower 212a2 passes through the single-sided cam section X4 of the associated rear inner cam groove 211a2, each rear cam follower 212a2 does not deviate from a reference cam diagram δ of the associated rear inner cam groove 211a2 since the head (radially outer end portion) of each rear cam follower 212a2 is supported by the bottom surface 222c2 of the associated rear inner cam groove 211a2 (to be prevented from coming out therefrom in a radial direction). Moreover, if an extension spring is installed so as to bias each front cam follower 212a1 against the inclined side surface 222b1 of the associated front inner cam groove 211a1 (and so as to bias each rear cam follower 212a2 against the inclined side surface 222b2 of the associated front inner cam groove 211a2), each cam front follower 212a1 can securely move on the reference cam diagram γ of the associated front inner cam groove 211a1 (and each rear cam follower 212a2 can securely move on the reference cam diagram δ of the associated rear inner cam groove 211a2).

Accordingly, due to the front and rear end portions of the cam ring being absent in this manner allows a further reduction in length of the cam ring in the optical axis direction without sacrificing the amount of movement of the associated lens group in the optical axis direction.

The present invention is not limited solely to the particular embodiments described above. For instance, although each of the set of three front inner cam grooves 11a1 and the set of three rear inner cam grooves 11a2 are formed at different circumferential positions in a circumferential direction of the cam ring 11, the set of three rear inner cam grooves 111a2 are formed at different circumferential positions in a circumferential direction of the cam ring 111, each of the set of three front cam followers 12a1 and the set of three rear cam followers 12a2 are formed at different circumferential positions in a circumferential direction of the second lens group moving frame 12, and the set of three rear cam followers 112a are formed at different circumferential positions in a circumferential direction of the second lens group moving frame 112, the number of cam grooves formed on the cam ring and the corresponding number of cam followers formed on the second lens group moving frame are optional.

Although each of the front and rear end surfaces of the cam ring lies in a plane orthogonal to the photographing optical axis Z in each of the above described embodiments of the zoom lenses, each of the front and rear end surfaces of the cam ring can include a surface which lies in a plane not orthogonal to the photographing optical axis Z. For instance, if the inclined side surface 22b is completely absent in the single-sided cam section X1 of each front inner cam groove 11a1, with both the inclined side surface 22a and the bottom surface 22c remaining, the cam ring 11 consequently has a shape wherein a part of the rear end of the cam ring 11 is absent. However, even if the cam ring 11 is partly absent in this manner, the reliability of the operation of the plurality of cam followers 12a (12a1 and 12a2) is not deteriorated.

Although the second lens group moving frame (linearly movable frame) 12 of the zoom lens is linearly moved via rotation of the cam ring 11 without relatively rotating thereto in the illustrated embodiments, it is possible to apply the present invention to a lens group moving frame (movable frame) in which a rotational component is also included during the movement thereof along the optical axis direction.

The above described structure of the single-sided cam sections (X1, X2, X3 or X4) of the cam ring (11, 111 or 211) is not limited solely to the particular embodiments described above. For instance, it is possible for the inclined side surface 22b and a portion of the bottom surface 22c adjacent to the absent inclined side surface 22b which extends to the associated reference cam diagram α to be absent in the single-sided section X1 of each rear inner cam groove 11a2. Namely, a degree of freedom exists in the formation of each single-sided section, in which one of the two inclined side surfaces that is positioned closer to a nearby end of the cam ring in the optical axis direction and a portion of the bottom surface adjacent to the this inclined side surface can be absent in a state where the continuity of the reference cam diagram is maintained.

Although each of the above described embodiments relates to a zoom lens, the present invention can also be applied to similar cam mechanisms of any other optical instrument.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cam mechanism of a lens barrel, comprising:
   a cam ring; and
   a movable frame which moves along an optical axis of an optical system when said cam ring is rotated by engagement of at least one cam groove comprising two cam groove segments, provided on said cam ring with at least one corresponding cam follower provided on said movable frame, said movable frame supporting at least one optical element of said optical system,
   wherein said cam groove is formed as a bottomed cam groove including two inclined side surfaces and a bottom surface which connects said two inclined side surfaces to each other, a width of said cam groove decreasing in a depth direction in a cross section orthogonal to a direction of a reference cam diagram of each said cam groove,
   wherein:
   said cam groove comprises at least one single-sided cam section, which is formed by removing a section of one of said two included side surfaces which is positioned closer to a nearby end of said cam ring, and
   one of said two cam groove segments extends from a first end of said single-sided cam section, and the other of said two cam groove segments extends from a second end of said single-sided cam section, such that said single-sided cam section and said two cam groove segments maintain continuity of said reference cam diagram of said cam groove.

2. The cam mechanism according to claim 1, wherein said one of said two inclined side surfaces which is positioned closer to a nearby end of said cam ring in a direction of said optical axis is completely absent at said single-sided cam section.

3. The cam mechanism according to claim 2, wherein a part of said bottom surface is absent while the other of said two inclined side surfaces remains.

4. The cam mechanism according to claim 1, further comprising a linear guide plate which is supported by said cam ring so as to integrally move with said cam ring in a direction of said optical axis while being allowed to freely rotate relative to said cam ring,
   wherein said one of said two inclined side surfaces which is positioned closer to said nearby end of said cam ring in said optical axis direction is completely absent in said single-sided cam section of said cam groove, and
   wherein said linear guide plate includes a inclined retaining surface which complements said absent said one of said two inclined side surfaces.

5. The cam mechanism according to claim 1, wherein each of said opposite end surfaces of said cam ring lies in a plane orthogonal to said optical axis.

6. The cam mechanism according to claim 1, wherein said lens barrel is configured as a zoom lens, and
   wherein said single-sided cam section is included in a zooming section of said cam groove for changing a focal length of said zoom lens.

7. The cam mechanism according to claim 1, wherein said cam ring and said movable frame are biased relative to each other in directions to make said cam follower contact with at least one of said two inclined side surfaces.

8. The cam mechanism according to claim 1, wherein said cam ring comprises at least two of said cam grooves which are located at different positions at least in an optical axis direction and trace substantially a same reference cam diagram;
   wherein said movable frame comprises at least two of said cam followers which are located at different positions at least in an optical axis direction and are respectively engageable in said at least two cam grooves; and
   wherein, when said movable frame moves to at least one of opposite movement limits thereof in said optical axis direction, one of said at least two cam followers remains engaged in a corresponding one of said at least two cam grooves while the other of said at least two cam followers comes out of an end opening of corresponding another of said at least two cam grooves and is disengaged therefrom.

9. The cam mechanism according to claim 1, wherein each said bottomed cam groove has a truncated trapezodial shape in cross section.

10. The cam mechanism according to claim 1, wherein said cam ring is positioned around said movable frame, and
    wherein each said bottomed cam groove is formed on an inner peripheral surface of said cam ring, and
    wherein each said cam follower projects radially outward from an outer peripheral surface of said movable frame and is engaged in a respective said bottomed cam groove.

11. The cam mechanism according to claim 1, wherein said at least one optical element of said optical system comprises a lens group.

12. The cam mechanism according to claim 1, wherein said at least one cam groove comprises a plurality of front cam grooves formed at different circumferential positions, and a plurality of rear cam grooves formed at different circumferential positions behind said plurality of front cam grooves,
    wherein said at least one cam follower comprises a plurality of front cam followers and a plurality of rear cam followers, which are engaged in said plurality of front cam grooves and said plurality of rear cam grooves, respectively.

13. The cam mechanism according to claim 12, wherein said at least one single-sided cam section is formed as part of each of said plurality of front cam grooves which is open on a rear end surface of said cam ring.

14. The cam mechanism according to claim 12, wherein each of said plurality of front cam grooves and each of said plurality of rear cam grooves are formed as a continuous groove and a discontinuous cam groove, respectively.

* * * * *